Patented May 9, 1950

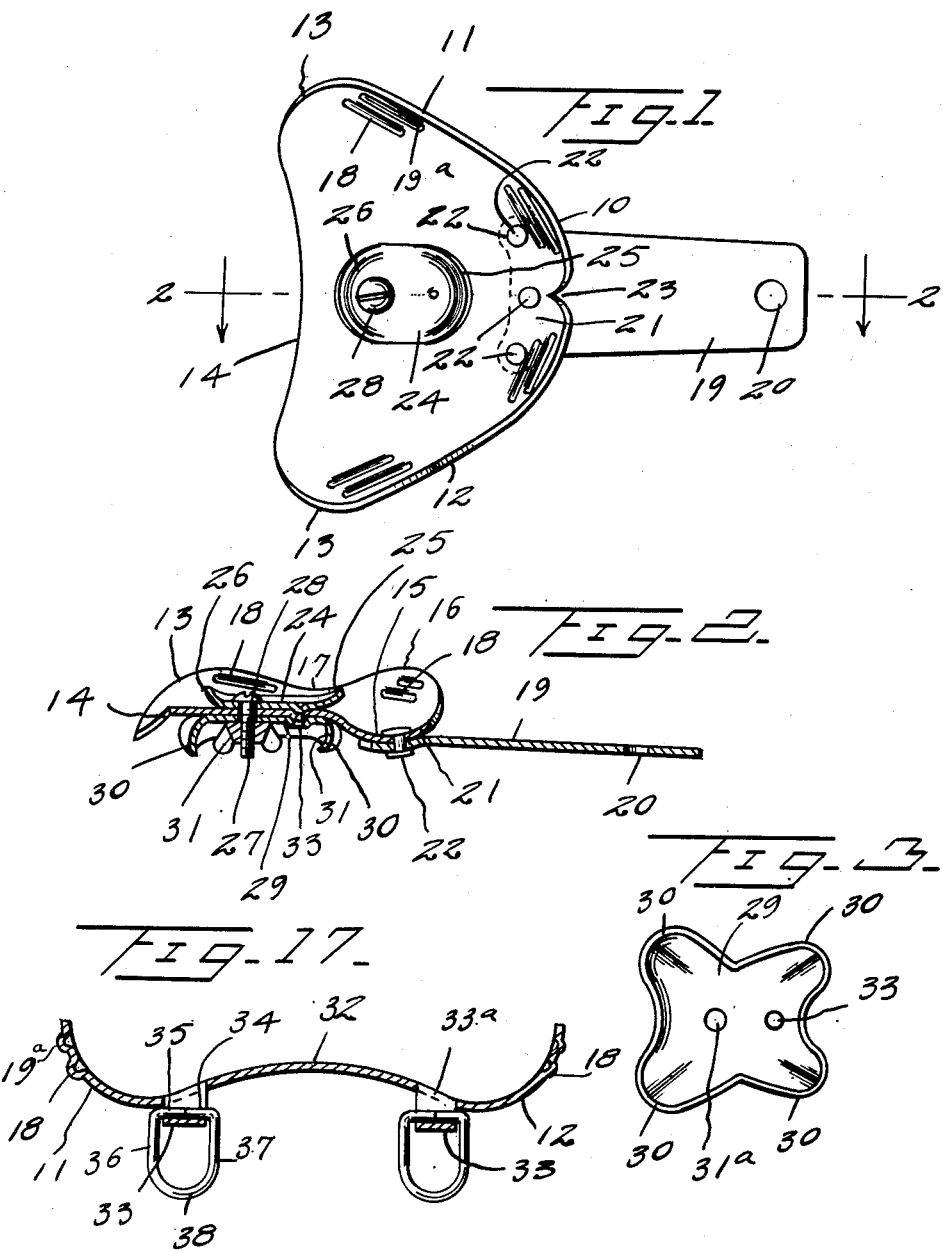

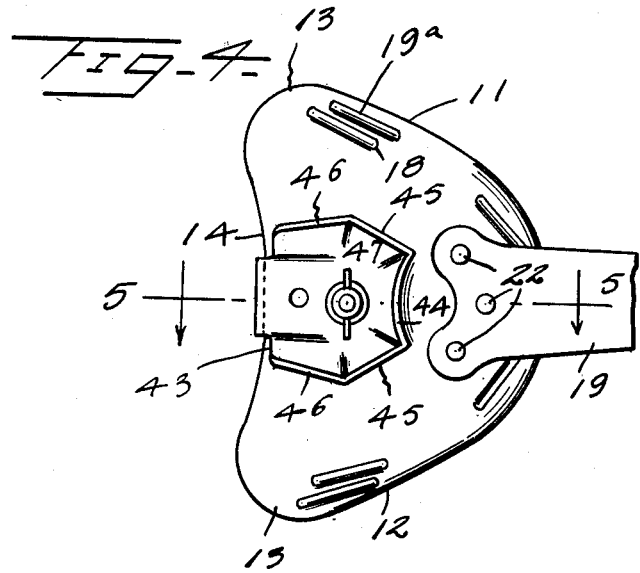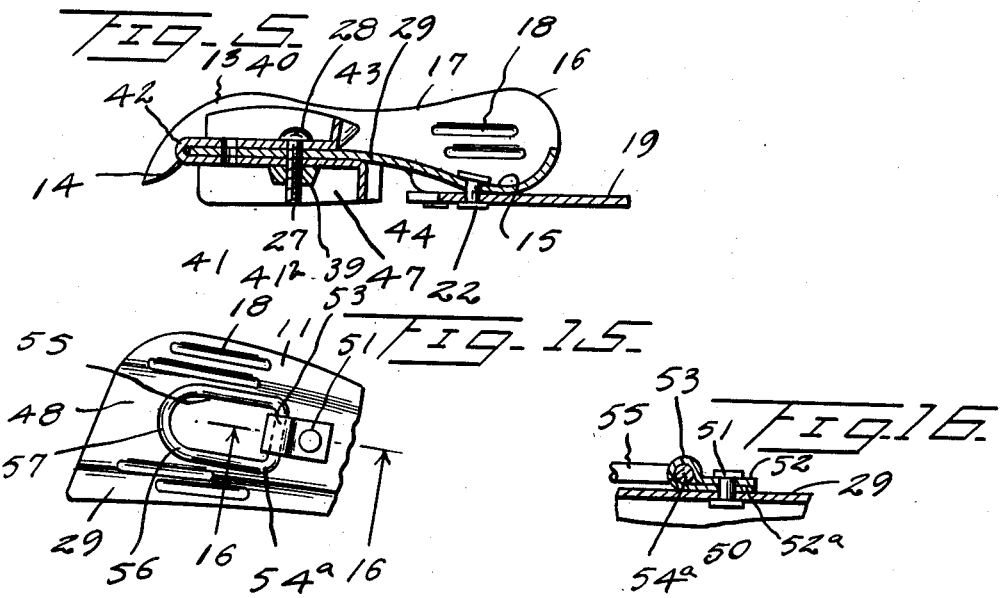

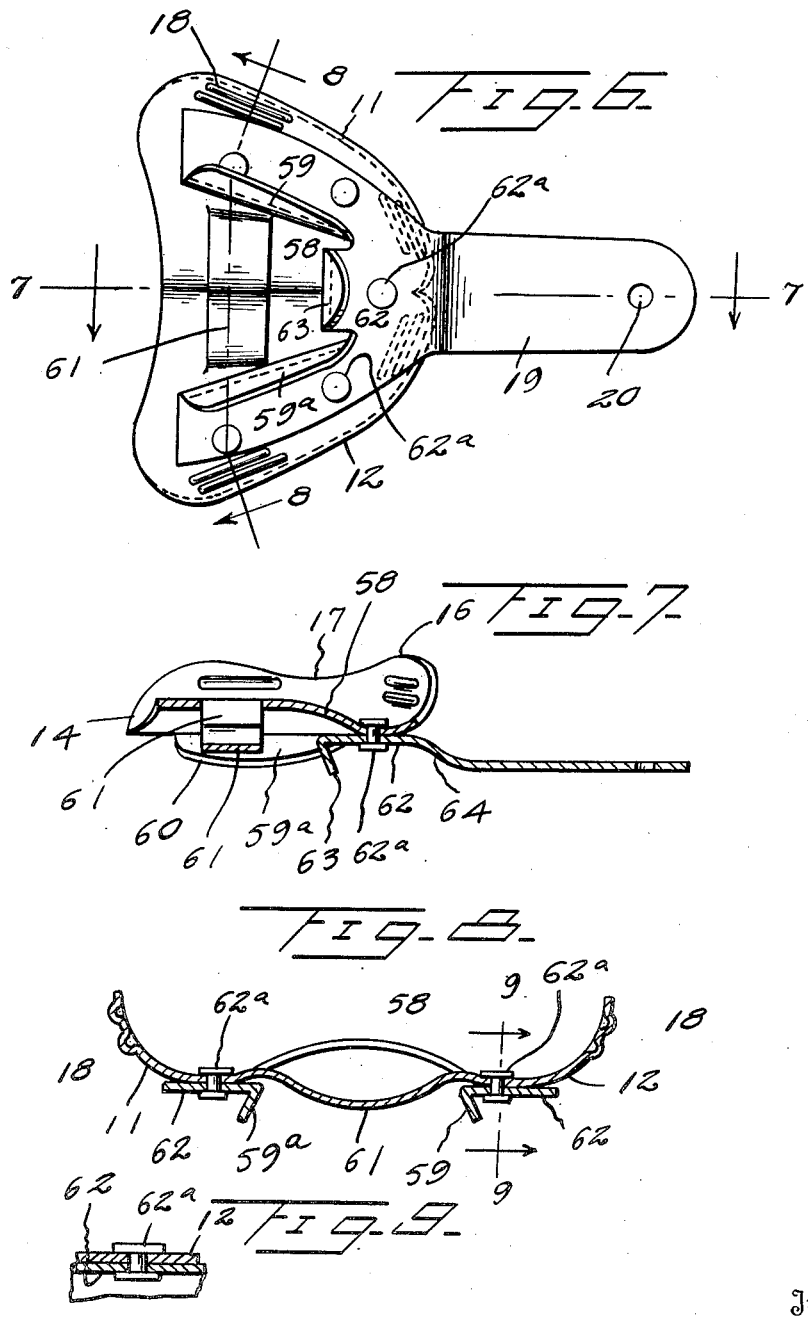

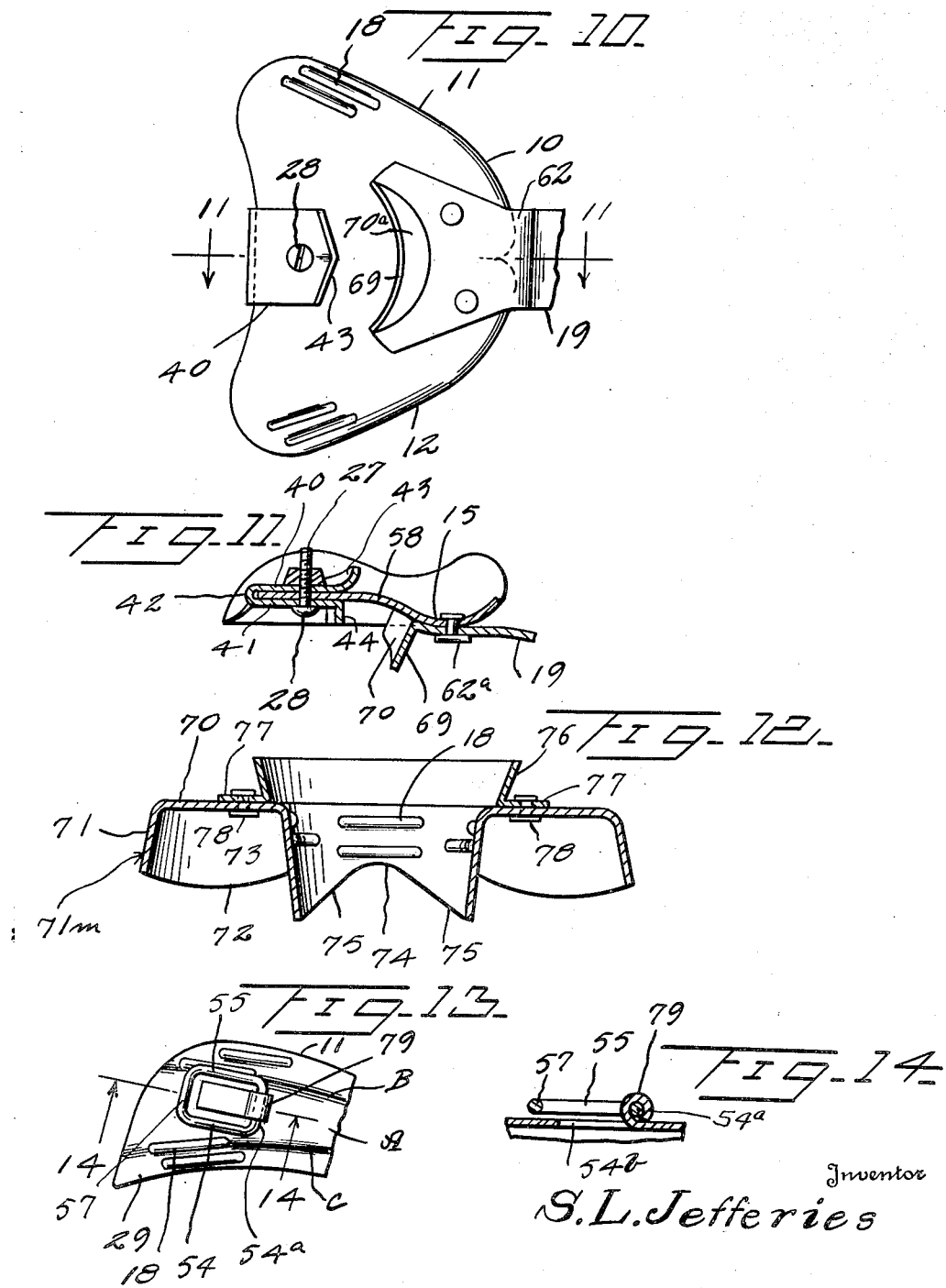
May 9, 1950     S. L. JEFFERIES     2,506,875
IMPRESSION TRAY
Filed April 22, 1946     4 Sheets-Sheet 4

2,506,875

UNITED STATES PATENT OFFICE 2,506,875

IMPRESSION TRAY

Samuel Lionel Jefferies, Gaffney, S. C.

Application April 22, 1946, Serial No. 663,982

3 Claims. (Cl. 32—19)

The present invention relates to improvements in dental impression trays and the like, and has for its object to provide a simple, efficient and inexpensive device.

Another object thereof is to provide various forms of dental impression trays of such form, shape, and construction, and function as to render conventional devices of this kind used by the dental profession, by dental mechanics, and others more efficient, useful, and serviceable.

Another object thereof is to provide a dental tray, one side of which is adapted to be used as a tray to receive and hold in anchored relation impression making material for taking an impression of the upper jaw, and the other side of which is adapted to be used for recording or registering bites.

A still further object thereof is to provide novel form of impression trays where due regard is paid not only to taking proper impressions from impression making materials that are caused to be firmly anchored to the tray in removable relation before, during, and after impression taking is resorted to and after material has hardened in the tray, but which also bestows attention to the special exigencies of practice as where either the upper or lower jaw of a person's mouth has all or some teeth missing and whether or not proper biting records can be made accordingly.

Another object thereof is to provide a dental impression tray serviceable to distribute over the tray and hold firmly anchored thereto the wax, plastic, or other impression making materials that are used therein and thereon.

Another object thereof is to provide a dental impression tray with means designed to spread over the effective area of the impression tray the impression making material in a soft, mouldable condition, and to fold against said material thus laid out looped links as a means of reinforcing said material before it hardens and as a means of assisting in anchoring the same to the tray.

A further object thereof is to provide in conjunction with a dental impression tray various forms of adjuncts thereto presenting hollow rimmed thin bodies, in, about, and around which mouldable impression making material is placed at the same time that it is placed upon the tray proper so as to afford irregular shaped projecting portions to which may cling said material not only when in a soft condition, but when it has hardened.

A principal object of this invention is the use of any of the trays, both lower and upper trays, singularly without an anterior handle for use as bite trays, and with an anterior projecting handle attached for use mostly in impression taking. This idea being only one of the many combination features, and by substitution of any of the combination features, singularly or collectively, all of the trays may be used to cover any tray problems of impression and bite taking and recording which may be presented.

With the above and other objects in view, my invention consists in the combination, arrangement and details of construction disclosed in the drawings and specification, and then more particularly pointed out in the appended claims.

In the drawings, wherein similar reference characters designate similar parts throughout the respective views, Figure 1 is a top plan view of one form of my invention, Figure 2 is a sectional view taken on the line 2—2 of Figure 1, Figure 3 is a bottom plan view of a bite recording body detached from the tray, Figure 4 is another form of my invention in top plan, Figure 5 is a sectional elevation of Figure 4, Figure 6 is a still further view of a modified form of my invention, shown in bottom plan view, Figure 7 is a sectional view taken on line 7—7 of Figure 6, Figure 8 is a cross sectional view taken on line 8—8 of Figure 6, Figure 9 is a fragmentary detail view of a fastener means, Figure 10 is a still further modification of my invention in bottom plan, Figure 11 is a sectional view taken on line 11—11 of Figure 10, Figure 12 is a transverse sectional view of a modified form of lower impression tray, Figure 13 is a fragmentary perspective view of a looped link member carried by the tray, Figure 14 is a fragmentary detail view of Figure 13, Figure 15 is a sectional elevation of another form of my invention, Figure 16 is a fragmentary detail view of a cotterpin or rivet attachment to secure a looped link in place, and Figure 17 is a cross section of a tray equipped with looped links for a purpose to be described.

Referring to the drawings which are merely illustrative of my invention, the parts are described. In Figure 1 is shown an upper impression tray 10 shaped like a jaw of the human mouth, which is rounded at the back, has divergent edges 11 and 12 and a rimmed concave front 14. The latter jaw slopes downwardly in the form of a lip. The opposite rear corners may be rounded as at 13. The rear portion is concave in cross section and sunken in with respect to the central portion 17. At 15 is a hump portion and a sheet metal bar handle 19 has its inner end as at 21 curving around part 15 of the tray being fastened here by means of the rivets or pins 22. Extending over the marginal surfaces of the tray are indented grooves 18. They are staggered as at 19a.

Designed to be removably attached to the center of the tray upon its outer side is an oval shaped hollow rimmed cup or retaining member preferably made out of sheet metal. Its bottom abuts the top of the tray. A set screw 27 passes through this member and its head 28 overlies the bottom of member 24.

This member has an endless rim 25, which makes it cup shaped for receiving and locking the impression material. The ends thereof may be raised as at 26. On the opposite or bottom side of the tray 10, also at the center, is mounted another hollow rimmed member of irregular shape and formation as is shown in Figure 3. It has four corner scallops 30 separated by curved recesses. It has a hole 31a for the reception of the screw 27. It is mounted in position so as to overlie the bottom face of the tray so that its flanged run faces downwards in a direction opposite to the direction in which the flanged wall of the other member 24 faces. A wing nut 31 threaded upon set screw 27 clamps members 24 and 30 on opposite sides of the same tray. The cup member shown in Figure 3 is designed to hold bite material so that the tray 10 may be used for both impressions and bites. In place of running a continuous run around member 30, 30 may consist of a series of individual hook-shaped groups separated by intervening recesses. Teats 33 may also be formed of a member 30 to prevent rotation of this member.

In Figures 4 and 5, another form of my invention is disclosed. The same shape of upper impression tray is illustrated. The handle 19, if used, has its inner end attached by fasteners 22 to the bottom of the tray. The usual marginal alternately arranged indented grooves 18 and 19 are employed. The construction of the impression material anchoring and bite registering bodies varies from what has previously been described. A U-shaped metal casting or piece has its opposing sides 40 and 41 placed contiguous to each other with the bight portion 42 connecting them. Into the slit intervening between these sides 40 and 41 the inner end of the tray is inserted and held snugly. Formed integrally upon the side 40 of this structure is the cup-shaped body designated 47 which has an irregular rimmed flange consisting of ridges 44, 45, 46 repeated on opposite sides thereof, ridge 44 being concavo-convex and the other rides being all straight edges. The body 47 is designed to hold or retain bite material on the lower side of the impression tray.

The other side 41 of this structure has also formed as an integral adjunct thereof a cup-shaped body 44 having an endless rim or flange therearound. This is the impression material anchoring part, while body 47 is taking records of biting on the part of the patient undergoing dental treatment. In order to hold the two bodies together in removable relation to the tray, I make use of a set screw 27 whose head 28 abuts the floor of body 44. A wing nut 39 may then be screwed home upon this set screw 27 and bind against the underface of side 41 of the body 47. In this way both bodies are clamped to the tray.

It will be noted that the form of my invention in Figures 10 and 11 conforms to the general outline of parts disclosed in Figures 4 and 5. One difference is to be found in the shape of the lip 43, which in Figure 10 is V-shaped. Another difference is in the handle 19. In Figures 10 and 11 the handle 19 is seen to be formed with a downturned horseshoe shaped tongue 69, the front face 70a of which is arcuate in shape. This tongue projects below the bottom of the bite registering ridge 44. Otherwise, these figures are all identical.

Figures 15 and 16 illustrate, as do Figures 13 and 14, the use of looped links movably connected at certain points of the impression tray, one method of attachment being shown in Figures 14 and 13, and another form in Figures 15 and 16. The top link has the opposing long arms 54 and 55, a cross arm 57 at one end, and two oppositely arranged cross terminals 54a disposed parallel to arm 57. A keeper 79, in one form of attachment, is bent and rolled back as an integral adjunct of the floor of the tray of Figure 13, being stamped out from slot 54b therein. This tray is formed with longitudinally depressed grooves one of which is shown marginally of the tray in Figure 13, consisting of the track A, and side shoulders B and C. In this track the keeper 79 extends so that by springing in the resilient terminals 54a of the looped link into opposite ends of this keeper, this loop link is pivotally mounted in this track A so when folded down as shown in Figure 13 therein, it is flush with shoulders B and C.

The other method of attaching the loop link shown in Figures 15 and 16 varies from what already been described only in this; that the keeper 53 is the bight portion of a sheet metal strap bent so that it has opposing sides 52 and 52a overlapping each other and the bight portion extended laterally of side 52a. Headed pins are used to fasten these parts to the floor 29 of the impression tray. One head of the pin engages the tray, and the other head 51 of the pin overlies the side 52 of the clip. Before closing the bight portion of this clip the cross arms 54a of the looped link will be mounted therein.

Another form of my invention is disclosed in Figures 6 and 7. This is one of the most serviceable forms thereof. The impression tray is of the usual jaw-resembling formation and shape. However, its floor 58 is formed transversely and centrally thereof with an indented downwardly bulging portion 61 spaced under the lower face of the floor 58 of the tray. The offset portion 61 provides a means for firmly locking the impression material in the tray. A handle member 19 includes as an adjunct thereof integral means for anchoring the plastic material which is to be placed upon the under side of the tray to register or record the bite of the patient undergoing dental treatment. This is a specially shaped member that has been designed to do away with the necessity of using a special small flanged or cup-shaped body at the center of the under side of the tray for this purpose, such as has been previously set forth therein.

The handle member is formed of sheet metal. It is shaped to provide the flat handle proper, which is offset at 64 where a straight portion 62 extends beyond the handle portion 19 and is secured by fastener 62a to the adjacent part of the tray floor 58. A horseshoe shaped integral portion is formed upon portion 62 of the member short of its inner end, consisting of the oppositely arranged and inwardly divergent flanges 59 and 59a, the outer edges of which follow the curvature of the adjacent sides of edges of the impression tray. The inner marginal edges of these flanges 59, 59a are bent back at an obtuse angle, the bottom edges of the out-turned flanges 59 and 59a being rounded as at 60. The terminal of portion 62 of this handle member is also bent back at an angle, relatively to its main length as at 63, and the lower edge thereof is also rounded. It will be seen that this lip 63 is disposed transversely of the axis of the tray at an angle to the outwardly convergent flanges 59 and 59a of the arms of the horseshoe shaped portion of the handle member. It is also seen that this lip 63 extends in the same transverse direction as the indented portion 61 of the floor 58 of the tray.

In Figure 12 is disclosed another arrangement breaking away from the usual method of making the lower impression trays for use as an impression taker and bite recorder. Here is disclosed a lower tray generally designated 71m. The member which holds the impression making material on one side, and the bite recording material on the other side thereof is designated 70 being a flat body of approved shape formed with a downwardly disposed endless skirting flange 71 preferably flaring downwardly. A pair of centrally positioned registering and intercommunicating material holding bodies of U-shaped formation are employed, designated respectively 76 and 73.

The body 76 is upwardly flaring, having an integral flange overlying the flat portion 70 and attached centrally thereto as to 77. An opening is formed upon this portion 70 by reason of the fact that the central portion thereof has been swaged or upset so as to provide the depending arcuate portion 73. This opening registers with the U-shaped space of the body 76. The body 73 preferably tapers conically downwardly of the member 70. It is formed with the usual indented grooves 18. The wall of this body 73 is cut away in such a manner that an upwardly extending converging recess is made by oppositely sloping the edges 75 and joining them at the crotch 74 at the inner plane of the recess.

In Figure 17 it is seen that a tray is disclosed which is similar in shape to what is shown in Figure 9 as to cross section, save that there is no downwardly bulging central offset. There is, nevertheless, punched out from holes 33a at the opposing margins of the tray depressed rolled back portions forming keepers 33 in which the cross separated rungs 34 and 35 of a loop link are received pivotally, the opposing arms of which are designated 36 and 37 and the arm opposite to the rungs 33. The links 36 and 37 are provided for engagement in the impression material on the lower side of the impression tray when the material is supported on both sides thereof in the formation of a bite impression.

In providing the present forms of dental trays with the adjuncts described, I have been endeavoring to devise shapely devices which the average dentist and dental technician can employ not only for general purposes but for special purposes as well, understood by those skilled in the art. The underlying idea is to provide on one side of the tray, on its top an anchoring means for the plastic soft impression making material for taking impressions of the jaw configuration and appendages, and on the other and opposite side of which is mounted means for registering or recording the bite of the patient undergoing dental treatment. These are facilities. An examination of certain forms herein described, such as 2, 5, 7, 11 and 12 reveals that either one or the other adjunct can be removed and the other left in position. Similarly wherever a handle is mounted upon the tray the same may, when desired, be left off. Again a special shape of anchoring member shown in one figure could interchangeably be used on another type of tray herein disclosed.

The facilities made possible by employment of any of the present forms of dental impression trays stem from the particular manner in which projecting parts are attached to the floor of the tray upon which may cling and be securely anchored the soft, pliable, workable, moldable impression-making material, in the act of initially working the same in and upon and about the surfaces of the tray and of the anchoring bodies of hollow rimmed formation secured to the center and upon either side thereof. At the same time due regard has been paid in shaping these varying forms to the exigencies, well understood by the dental profession, and to those skilled in the art to which my invention pertains, which render valuable and necessary such method of anchoring the impression making material or plastic composition, etc. After the working of same about the hollow rimmed bodies has been completed so as to cover up the same and expose an additional thickness of this mass, beyond reach of the outermost edges of said bodies, the jaw of the patient may be depressed thereon so as to leave indentations in the impression making material, while yet soft or hot, which will form the basis, when the mass has hardened, of making a model.

In making the model from the impression making material, some may remain intact upon the tray or removed therefrom, but in the latter case it has hardened first. Ordinarily an impression is taken of the jaw or teeth or both of the patient, using the anchoring member on the upper side of the tray alone. It is also sometimes practical to work the proper plastic soft material not only upon the member on one side intended for making an impression of the upper jaw and appendages thereon, if any, but also to work in the proper soft pliable material on the member on the other side of the tray intended to record or register the bite. The dentist will decide upon the occasion for doing this, in a proper case. It is relatively easy to remove either member by loosening the screw after removing the wing nut or lock nut clamping the member on the tray.

When the impression making material has hardened in the tray on either side thereof, if said material covers up and renders inaccessible the head of the screw bolt, then the nut screwed home on this bolt and accessible readily from the other side of the tray can be gotten at, removed, and so permit removal of the anchoring member and anchored impression material from the tray.

If, however, what is covered up and concealed from accessibility is not head of the securing bolt, but the nut or wing nut or lock nut, as the case may be, then the slit head of the bolt can be reached on the proper side of the tray, and by means of a screwdriver be screwed off from the nut, so the anchoring member with impression material thereupon, usually in a set and hardened condition, can again be removed from the tray. My invention, in this regard, therefore, renders it an easy matter to remove either anchoring member from either side of the tray.

Another condition that my invention rigidly meets is enabling the impresison taking material to remain on the tray and be held by the properly shaped anchoring member against displacement or separation from the tray in any occasion where strain, jolts, or vibrations is imposed upon the tray in trimming the edges down to meet the requirement of any special case, or to confine the overhanging portions of the plastic material in place upon the tray and cause same to maintain a desired shape. Should such strain, jolts or vibrations, from any source be imposed or transferred from tray to the particular form of anchoring member used, then it is necessary to assure that the impression taking material will not work loose, fail to cling onto the grooves 18, 19a and projections afforded by the anchoring hollow rimmed body, or otherwise become separated or detached or adhere loosely upon the tray, rendering same unfit for taking impressions of jaws and appendages, etc.

The special shapes imparted to some of the hollow rimmed anchoring members have just this effect, with particular regard to varying work or types of work done by dentists, they furnish exactly the proper means best suited for this kind of work, and calculated to firmly unite the workable, pliable impression material while soft or hot or both to the tray by means of said anchoring member in such a manner that when the mass hardens it will stay intact on the tray, and permit the dentist to shape both the mass and the tray as desired by employing tools or not for this purpose. While the mass, thus hardened, and the indentations already made, due to the patient having closed his jaws or jaw upon it at direction of the dentist, remain intact upon the tray, due to the moldable material clinging to all parts of the projections of the anchoring member on the central part of the tray, it may be required to make the model. It will be found that the anchorage of the hardened material from which such model is to be made is strong enough to allow this.

Figure 2 shows a bite registering anchoring member which especially is useful in providing a cluster of curved prongs in case it is desired to firmly unite the soft material therearound with adequate under and lateral support. In Figure 10 either anchoring member on either side of the tray has as a characteristic the capability of receiving, spreading, and holding for centering purposes the moldable material which is then spread out in all directions away from the center of the tray to its marginal anterior and posterior portions; in all such forms the edges of the hollow anchoring bodies act as material penetrating portions assuring non-separation of the mass from the tray after the same has set.

The form of device shown in Figure 12 has the property and characteristics of allowing a common mass of moldable composition material while soft and hot to be poured into the central hollow formation that projects both on top and below the tray or its equivalent member, and then be worked around the exterior parts of both the member 76 and member 73 for impression making purposes and for bite registering purposes as well. The dentist will find proper occasions for preferring this form in use. The handle is valuable in steadying the device when in actual use for any of the purposes herein set forth. Its removal faciiltates rather than helps the dentist in certain cases.

The form shown in Figure 6 is also for special occasional use. It is concerned chiefly for bite recording. In exacting cases of recording or registering bites, well known to those skilled in the art, or certain practitioners, the other forms are not of advantageous use. But here is shown the possibility of improving upon the holding quality and property in an anchoring member for recording bites. It will be readily seen that the special usefulness of this form of device resides in particular way in which the angular, parallel, and curved parts of projecting portions contribute to afford clinging surfaces for the moldable mass to be worked thereabout so as to conceal and continue the thickness of the impression making material outward from the floor of the tray. The workable material is free not only to cling on the annular projectings bodily, but will enter the space between downwardly bulging portion 60b and come out at the upper face of the floor of the tray where it is purposely spread out in all directions so as to overlie the tray. In this instance only the bite registering material anchoring member is used. Such an anchoring arrangement assures a most positive holding-on process of attaching the material removably upon the tray.

Finally another expedient I have provided for special occasions also known to those skilled in the art to which my invention relates, is that made possible by the use of movably mounted anchoring means. Such forms are disclosed particularly in Figures 17, 13 and 15. The merit of this resides in the fact that the looped links, in one position, hang down loosely upon the tray, so as to be out of the way of the dental technician applying the soft material in a molten condition or otherwise upon the tray, and especially of wiping parts thereof upon the marginal sides or wings of the tray, after which process he folds the loop links back so as to imbed them overlappingly into the soft material, so when same hardens these links will form anchoring parts to which the material intimately clings because some material will project through the slot of the link and others hold on to the arms thereof. The fact that grooved portions or tracks 48 or A are formed preferably marginally of the tray into which a portion of the soft material extends, while being penetrated by the looped links, is an assurance that other portions of the soft mass still being worked upon the tray may be extended over the sides or wings of the tray before the looped links are closed compressingly against and into the portions extending into said tracks. In this way, with particular attention stressed upon the marginal portions of the impression making material as well as on other parts of the tray, an ultimate effect is produced of an impressionable material that stays firmly anchored upon the tray along margins as well as upon the center.

On all the trays of this application, both upper and lower, at all places where channels and grooves appear, said channels and grooves may be alternated with or displaced by round perforations or holes, the location of these holes to be in pairs placed at above strategic points and of such size to permit impression and bite material to enter and to better tie and secure the material to the bite and impression trays, each pair of perforations to be made and used in the trays optionally; at some places channels or grooves will be used, and at other places holes will be used, or all grooves may be used on some trays and all holes may be used on other trays.

It is further understood that the various attachments applied to the upper tray may be used with the lower trays, and the attachments of the lower trays may be used with the upper trays.

What I desire to claim is:

1. A dental impression tray having one end sunk with relation to the other and of a concave-cross section, a pair of flanged thin members engaging opposite sides of said tray at the higher rear end of said tray with their flanges facing respectively up and down on opposite sides of the tray, a connecting member integral with said members and straddling said rear end of the tray, and means holding said members against undue displacement from said tray.

2. A dental impression tray having a concave cross section at one end, and flat at the opposite or rear end, a pair of cup shaped members on opposite sides of said tray at said rear end, an irregular marginal edge on said members, a marginal flange about the edges of said cup shaped members, a connecting member between said cup shaped members overlying the flat end of said body and means removably securing said cup shaped members on said impression tray.

3. A dental impression tray comprising a body having a flat bottom, an upturned flange on the sides and front of said bottom leaving an open rear edge, a pair of opposed cup shaped members disposed in overlying abutting relation one to the other engageable on said flat bottom over the rear edge thereof, a connecting member between said cup shaped members and correlated interengaging fastening members removably securing said cup shaped members to said impression tray, whereby one of said cup shaped members is adapted to be engaged in impression material on said tray and the other is adapted to be engaged in bite material on said tray opposite from said impression material.

SAMUEL LIONEL JEFFERIES.

REFERENCES CITED

The following references are of record in the file of this patent:

UNITED STATES PATENTS

| Number | Name | Date |
| --- | --- | --- |
| 508,677 | Burlinghame | Nov. 14, 1893 |
| 681,535 | Fowlring | Aug. 27, 1901 |
| 1,374,183 | Bridges | Apr. 12, 1921 |
| 2,352,545 | Jefferies | June 27, 1944 |

FOREIGN PATENTS

| Number | Country | Date |
| --- | --- | --- |
| 423,534 | Great Britain | Feb. 4, 1935 |